US010815783B2

(12) United States Patent
Diwinsky et al.

(10) Patent No.: US 10,815,783 B2
(45) Date of Patent: Oct. 27, 2020

(54) IN SITU ENGINE COMPONENT REPAIR

(71) Applicant: General Electric Company, Schenectady, NY (US)

(72) Inventors: David Scott Diwinsky, West Chester, OH (US); Herbert Chidsey Roberts, Middletown, OH (US)

(73) Assignee: General Electric Company, Schenectady, NY (US)

( * ) Notice: Subject to any disclaimer, the term of this patent is extended or adjusted under 35 U.S.C. 154(b) by 33 days.

(21) Appl. No.: 15/988,708

(22) Filed: May 24, 2018

(65) Prior Publication Data

US 2019/0360338 A1 Nov. 28, 2019

(51) Int. Cl.
*F01D 5/00* (2006.01)
*B05B 13/02* (2006.01)
*B05B 15/70* (2018.01)

(52) U.S. Cl.
CPC .......... *F01D 5/005* (2013.01); *B05B 13/0278* (2013.01); *B05B 15/70* (2018.02); *F05D 2230/80* (2013.01)

(58) Field of Classification Search
CPC ... F01D 5/005; F01D 5/12; F01D 5/04; F01D 5/30; F01D 7/00; F01D 1/30; F01D 13/00; F01D 9/02; F01D 9/047; B23P 6/045; B23P 6/007; B23P 6/002; B23P 6/00; B23K 26/144; B23K 26/702; B23K 26/342; B23K 26/0884; B23K 26/032; B23K 2101/001; B23K 2103/26; G01N 21/954; F05D 2260/83; F05D 2230/234; F05D 2230/80; F05D 2230/13; F05D 2220/32; B21D 3/10; B21D 3/14; B21D 3/16
See application file for complete search history.

(56) References Cited

U.S. PATENT DOCUMENTS

| | | | |
|---|---|---|---|
| 5,536,022 A * | 7/1996 | Sileo | C23C 4/02 277/415 |
| 5,723,078 A | 3/1998 | Nagaraj et al. | |
| 6,210,488 B1 | 4/2001 | Bruce | |
| 6,524,395 B1 | 2/2003 | Devine, II | |
| 6,544,346 B1 | 4/2003 | Grossklaus, Jr. et al. | |
| 6,641,907 B1 * | 11/2003 | Merrill | C04B 38/0038 428/313.9 |
| 6,908,657 B2 | 6/2005 | Farmer et al. | |
| 6,977,060 B1 * | 12/2005 | Merrill | C04B 38/08 419/5 |

(Continued)

FOREIGN PATENT DOCUMENTS

| | | |
|---|---|---|
| DE | 102009060570 | 7/2011 |
| JP | H04236757 A | 8/1992 |

OTHER PUBLICATIONS

European Search Report Corresponding to Application No. 19175343 on Sep. 18, 2019.

*Primary Examiner* — Lawrence Averick
(74) *Attorney, Agent, or Firm* — Dority & Manning, P.A.

(57) ABSTRACT

A method for repairing a turbine engine includes determining a measure of a gap between the outer ends of a plurality of airfoils and an outer band is greater than a predetermined amount; and depositing an abradable material on the outer band in situ to reduce the measure of the gap between the outer ends of the plurality of airfoils and the outer band.

13 Claims, 8 Drawing Sheets

(56) References Cited

U.S. PATENT DOCUMENTS

| | | | |
|---|---|---|---|
| 7,198,462 B2* | 4/2007 | Merrill | C04B 38/0038 |
| | | | 415/173.4 |
| 7,216,485 B2 | 5/2007 | Caldwell et al. | |
| 7,316,850 B2 | 1/2008 | Hu et al. | |
| 7,509,735 B2 | 3/2009 | Philip et al. | |
| 7,578,178 B2 | 8/2009 | Boyer et al. | |
| 7,622,160 B2 | 11/2009 | Gupta et al. | |
| 7,805,822 B2 | 10/2010 | Hanley | |
| 8,215,159 B2 | 7/2012 | Kell et al. | |
| 8,437,010 B2 | 5/2013 | Bostanjoglo et al. | |
| 9,085,053 B2* | 7/2015 | Tholen | B23P 6/007 |
| 9,523,287 B2 | 12/2016 | Bellino et al. | |
| 9,657,589 B2 | 5/2017 | Hjerpe | |
| 9,702,817 B2 | 7/2017 | Worth et al. | |
| 9,707,645 B2 | 7/2017 | Ozturk et al. | |
| 9,709,463 B2* | 7/2017 | DeAscanis | G01M 15/14 |
| 10,024,161 B2* | 7/2018 | McCall | F01D 5/20 |
| 10,065,243 B2* | 9/2018 | Strock | B22F 5/04 |
| 2004/0069324 A1 | 4/2004 | Velez, Jr. et al. | |
| 2004/0219010 A1* | 11/2004 | Merrill | C04B 38/0038 |
| | | | 415/173.4 |
| 2007/0237667 A1* | 10/2007 | Merrill | C04B 38/08 |
| | | | 419/5 |
| 2008/0023037 A1 | 1/2008 | Kool et al. | |
| 2010/0287754 A1 | 11/2010 | Graichen | |
| 2011/0150636 A1* | 6/2011 | Tholen | F01D 5/005 |
| | | | 415/173.1 |
| 2013/0167375 A1 | 7/2013 | Roesing et al. | |
| 2014/0093360 A1* | 4/2014 | Strock | F01D 11/122 |
| | | | 415/173.4 |
| 2015/0092039 A1 | 4/2015 | Ruhge et al. | |
| 2015/0300920 A1* | 10/2015 | DeAscanis | F01D 21/003 |
| | | | 356/614 |
| 2016/0230558 A1* | 8/2016 | McCall | C23C 28/027 |

* cited by examiner

IN SITU ENGINE COMPONENT REPAIR

FIELD

The present subject matter relates generally to a system and method for repairing an abradable material within a gas turbine engine.

BACKGROUND

At least certain gas turbine engines include, in serial flow arrangement, a compressor section including a low pressure compressor and a high-pressure compressor for compressing air flowing through the engine, a combustor for mixing fuel with the compressed air such that the mixture may be ignited, and a turbine section including a high pressure turbine and a low pressure turbine for providing power to the compressor section.

Each of the compressors and turbines may include multiple stages of rotating airfoils for adding energy to, or extracting energy from, the air flowing therethrough. One or more of the stages of airfoils may have an abradable layer surrounding it to create a tighter seal with the radially outer edges thereof to increase an efficiency of the turbine engine. It will be appreciated, however, that through the normal course of operation, the abradable layer may become worn down. For example, through engine cycles, the expansion and contraction of engine components due to, e.g., changing operating temperatures, may bring the abradable layer into closer contact with the radially outer tips of the stage of rotating airfoils which it surrounds. Further, metallic particles from the engine may form into the abradable layer, such that the abradable layer becomes more susceptible to expansion and contraction as well.

Accordingly, after a certain amount of wear the turbine engine must be taken off wing, disassembled to expose the abradable layer and repaired. Such is a timely and costly exercise. Therefore, an improved system and/or method of repairing an abradable layer within an engine would be useful.

BRIEF DESCRIPTION

Aspects and advantages of the invention will be set forth in part in the following description, or may be obvious from the description, or may be learned through practice of the invention.

In one aspect of the present disclosure, a method is provided for repairing a turbine engine including a rotating stage of airfoils and an outer band surrounding the rotating stage of airfoils, the rotating stage of airfoils including a plurality of airfoils defining an outer end. The method includes determining a measure of a gap between the outer ends of the plurality of airfoils and the outer band is greater than a predetermined amount; and depositing an abradable material on the outer band in situ to reduce the measure of the gap between the outer ends of the plurality of airfoils and the outer band.

In certain exemplary aspects depositing the abradable material on the outer band in situ includes depositing the abradable material using a spray module attached to at least one airfoil of the plurality of airfoils.

For example, in certain exemplary aspects depositing the abradable material on the outer band in situ further includes rotating the plurality of airfoils while depositing the abradable material on the outer band in situ.

In certain exemplary aspects the turbine engine defines a radial direction and a circumferential direction, and wherein determining the measure of the gap between the outer ends of the plurality of airfoils and the outer band includes determining a two-dimensional measure of the gap along the radial direction and the circumferential direction.

In certain exemplary aspects the turbine engine defines an axial direction, a radial direction, and a circumferential direction, and wherein determining the measure of the gap between the outer ends of the plurality of airfoils and the outer band includes determining a three-dimensional measure of the gap along the axial direction, the radial direction, and the circumferential direction.

In certain exemplary aspects the turbine engine defines a circumferential direction, and wherein depositing the abradable material on the outer band in situ includes depositing the abradable material in a nonuniform manner along the circumferential direction on the outer band.

For example, in certain exemplary aspects depositing the abradable material in a nonuniform manner along the circumferential direction includes depositing the abradable material in a nonuniform manner along the circumferential direction to result in a nonuniform measure of the gap along the circumferential direction.

In certain exemplary aspects the method further includes removing in situ at least a portion of the existing abradable material.

In certain exemplary aspects the method further includes recontouring in situ the abradable material deposited on the outer band.

For example, in certain exemplary aspects recontouring in situ the abradable material deposited on the outer band includes recontouring in situ the abradable material deposited on the outer band utilizing a recontouring tool attached to at least one airfoil of the plurality of airfoils.

For example, in certain exemplary aspects recontouring in situ the abradable material deposited on the outer band further includes rotating the plurality of airfoils while recontouring in situ the abradable material deposited on the outer band.

In certain exemplary aspects the plurality of airfoils of the rotating stage of airfoils is a plurality of rotor blades.

In certain exemplary aspects depositing the abradable material on the outer band in situ includes depositing the abradable material in situ using a snake arm tool extending through an opening of the turbine engine.

In an exemplary embodiment of the present disclosure a repair tool is provided for repairing an abradable layer of an outer band surrounding a rotating stage of airfoils of a turbine engine. The repair tool includes a sensing module including a sensor configured to sense data indicative of a measure of a gap between the first airfoil and the abradable layer of the outer band; and a spray module configured for removable attachment to an airfoil of the rotating stage of airfoils, the spray module including a nozzle for spraying an abradable material onto the abradable layer.

In certain exemplary embodiments the spray module is configured for removable attachment to a second airfoil of the rotating stage of airfoils, and wherein the sensing module is configured for removable attachment to a first airfoil of the rotating stage of airfoils.

In certain exemplary embodiments the repair tool further includes a contour module configured to recontour the abradable material sprayed onto the abradable layer.

For example, in certain exemplary embodiments the contour module is configured for removable attachment to a third airfoil of the rotating stage of airfoils.

In certain exemplary embodiments the repair tool further includes a controller, wherein the sensing module and the spray module are each operably coupled to the controller.

For example, in certain exemplary embodiments the controller includes one or more processors and memory, wherein the memory stores data with the data including instructions that when executed by the one or more processors cause the repair tool to perform functions, the functions including determining a two-dimensional measure of the gap along a radial direction of the turbine engine and along a circumferential direction of the turbine engine.

For example, in certain exemplary embodiments the functions further include determining a three-dimensional measure of the gap along the radial direction, along the circumferential direction, and along an axial direction of the turbine engine.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Figure 1:
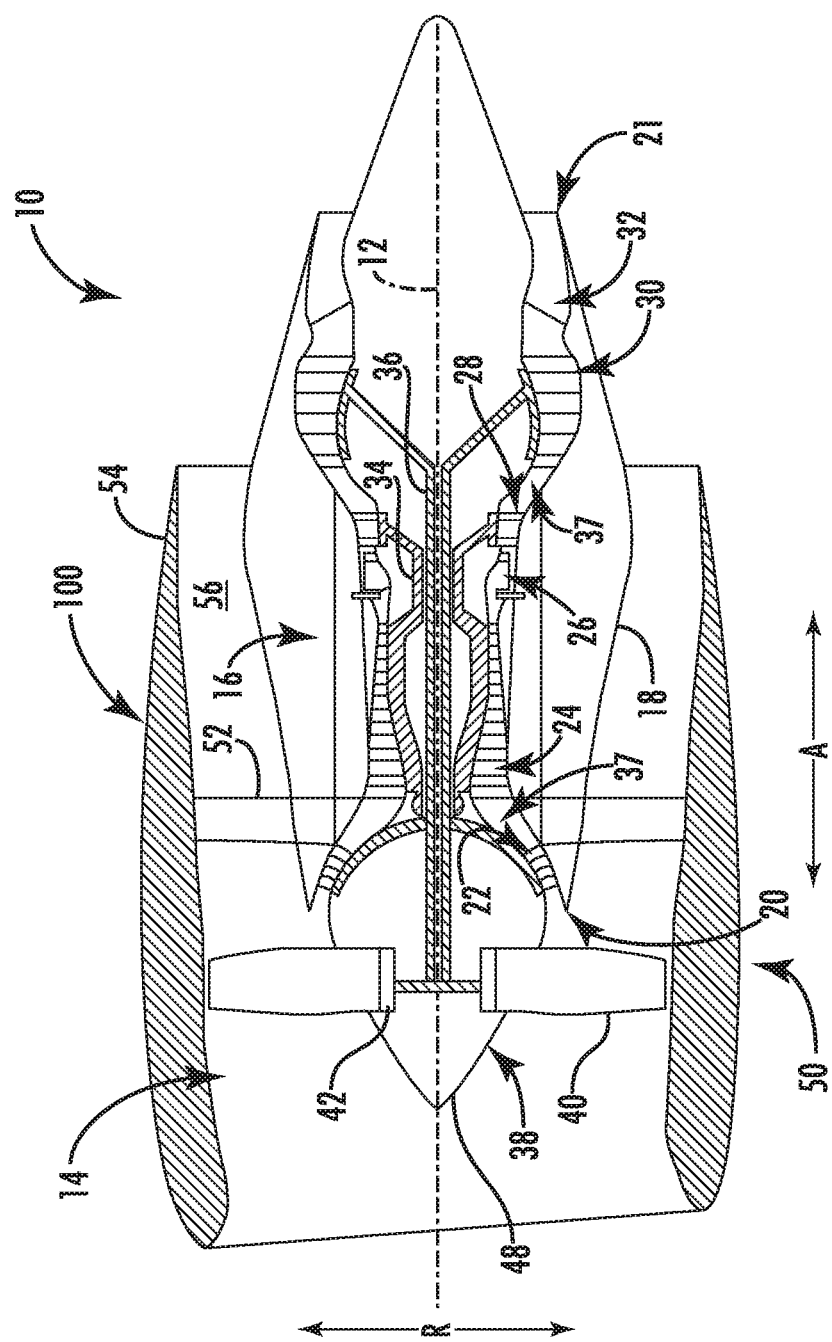
FIG. 1 is a schematic, cross-sectional view of a gas turbine engine in accordance with an exemplary aspect of the present disclosure.

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention.

As used herein, the terms "first", "second", and "third" may be used interchangeably to distinguish one component from another and are not intended to signify location or importance of the individual components.

The terms "forward" and "aft" refer to relative positions within a gas turbine engine or vehicle, and refer to the normal operational attitude of the gas turbine engine or vehicle. For example, with regard to a gas turbine engine, forward refers to a position closer to an engine inlet and aft refers to a position closer to an engine nozzle or exhaust.

The terms "upstream" and "downstream" refer to the relative direction with respect to fluid flow in a fluid pathway. For example, "upstream" refers to the direction from which the fluid flows, and "downstream" refers to the direction to which the fluid flows.

The terms "coupled," "fixed," "attached to," and the like refer to both direct coupling, fixing, or attaching, as well as indirect coupling, fixing, or attaching through one or more intermediate components or features, unless otherwise specified herein.

The singular forms "a", "an", and "the" include plural references unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 10 percent margin.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

Referring now to the drawings, wherein identical numerals indicate the same elements throughout the figures, FIG. 1 is a schematic cross-sectional view of a gas turbine engine in accordance with an exemplary embodiment of the present disclosure. More particularly, for the embodiment of FIG. 1, the gas turbine engine is a high-bypass turbofan jet engine 10, referred to herein as "turbofan engine 10." As shown in FIG. 1, the turbofan engine 10 defines an axial direction A (extending parallel to a longitudinal axis 12 provided for reference) and a radial direction R. The turbofan engine 10 also defines a circumferential direction C (see FIG. 3) extending circumferentially about the axial direction A. In general, the turbofan 10 includes a fan section 14 and a turbomachine 16 disposed downstream from the fan section 14.

The exemplary turbomachine 16 depicted is generally enclosed within a substantially tubular outer casing 18 that defines an annular inlet 20 and an annular exhaust 21. The outer casing 18 encases, in serial flow relationship, a compressor section including a booster or low pressure (LP) compressor 22 and a high pressure (HP) compressor 24; a combustion section 26; a turbine section including a high pressure (HP) turbine 28 and a low pressure (LP) turbine 30; and a jet exhaust nozzle section 32. A high pressure (HP) shaft or spool 34 drivingly connects the HP turbine 28 to the HP compressor 24. A low pressure (LP) shaft or spool 36 drivingly connects the LP turbine 30 to the LP compressor 22. The compressor section, combustion section 26, turbine section, and nozzle section 32 together define a core air flowpath 37 therethrough.

For the embodiment depicted, the fan section 14 includes a fixed pitch fan 38 having a plurality of fan blades 40. The fan blades 40 are each attached to a disk 42, with the fan blades 40 and disk 42 together rotatable about the longitudinal axis 12 by the LP shaft 36. For the embodiment depicted, the turbofan engine 10 is a direct drive turbofan engine, such that the LP shaft 36 drives the fan 38 of the fan section 14 directly, without use of a reduction gearbox. However, in other exemplary embodiments of the present disclosure, the fan 38 may instead be a variable pitch fan, and the turbofan engine 10 may include a reduction gearbox, in which case the LP shaft 36 may drive the fan 38 of the fan section 14 across the gearbox.

Referring still to the exemplary embodiment of FIG. 1, the disk 42 is covered by rotatable front hub 48 aerodynamically contoured to promote an airflow through the plurality of fan blades 40. Additionally, the exemplary turbofan engine 10 includes an annular nacelle assembly 50 that circumferentially surrounds the fan 38 and/or at least a portion of the turbomachine 16. For the embodiment depicted, the nacelle assembly 50 is supported relative to the turbomachine 16 by a plurality of circumferentially-spaced outlet guide airfoils 52. Moreover, a downstream section 54 of the nacelle assembly 50 extends over an outer portion of the casing 18 so as to define a bypass airflow passage 56 therebetween. The ratio between a first portion of air through the bypass airflow passage 56 and a second portion of air through the inlet 20 of the turbomachine 16, and through the core air flowpath 37, is commonly known as a bypass ratio.

It should be appreciated, however, that the exemplary turbofan engine 10 depicted in FIG. 1 is by way of example only, and that in other exemplary embodiments, the turbofan engine 10 may have any other suitable configuration, including, for example, any other suitable number of shafts or spools, turbines, compressors, etc. Additionally, or alternatively, in other exemplary embodiments, any other suitable turbine engine may be provided. For example, in other exemplary embodiments, the turbine engine may not be a turbofan engine, and instead may be configured as a turboshaft engine, a turboprop engine, turbojet engine, etc.

Figure 2:
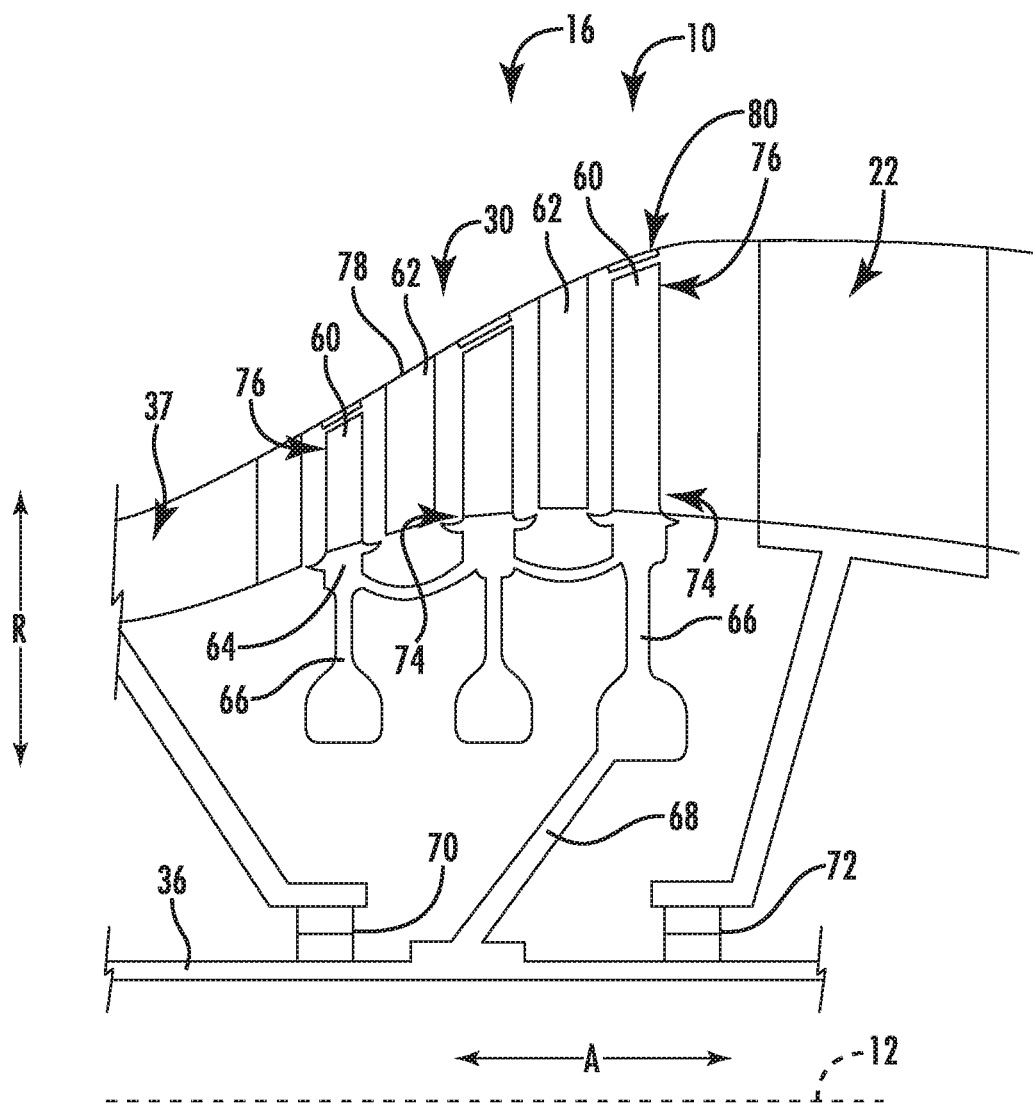
FIG. 2 is a close-up, cross-sectional view of an aft end of the exemplary gas turbine engine of FIG. 1.

Referring now to FIG. 2, a close-up, schematic view of an aft end of the turbomachine 16 of the exemplary turbofan engine 10 of FIG. 1 is provided. Specifically, FIG. 2 provides a close-up, schematic view of the LP turbine 30 of the turbine section of the exemplary turbofan engine 10 of FIG. 1.

As is depicted, the LP turbine 30 generally includes alternating stages of airfoils, and more specifically, includes alternating stages of LP turbine rotor blades 60 (i.e., rotating airfoils) and LP turbine stator airfoils 62 (i.e., stationary airfoils). Accordingly, it will be appreciated that as used herein, the term "airfoil" may be used to refer to a rotor blade or a guide airfoil. Each of the plurality LP turbine rotor blades 60 are attached at a base 64 to a respective LP turbine rotor 66. The LP turbine rotor 66 of each stage of LP turbine rotor blades 60 is connected to an adjacent LP turbine rotor 66—the plurality of LP turbine rotors 66 further connected to the LP shaft 36 through an LP shaft extension 68. Accordingly, a flow of combustion gasses through the LP turbine 30 rotates the plurality of LP turbine rotor blades 60 and LP turbine rotors 66, which in turn rotates the LP shaft 36. Additionally, as noted, the LP turbine 30 includes the plurality of stages of LP turbine stator airfoils 62, each of which attached to the casing 18 of the turbomachine 16. As will be appreciated, the stages of LP turbine stator airfoils 62 may increase an efficiency of the LP turbine 30. For the embodiment depicted, each stage of LP turbine stator airfoils 62 is positioned between adjacent stages of LP turbine rotor blades 60 or adjacent to a stage of LP turbine rotor blades 60.

Briefly, it will further be appreciated, that for the embodiment depicted, the LP shaft 36 is supported by a forward bearing 70 and an aft bearing 72. It should be appreciated, however, that in other exemplary embodiments, the LP shaft 36 may instead be supported in any other suitable manner. For example, in other exemplary embodiments, both the forward and aft bearings 70, 72 may be positioned forward of the extension member 68 of the LP shaft 36, or alternatively, may both be positioned aft of the extension member 68 of the LP shaft 36. Further, it will be appreciated that although the exemplary LP turbine 30 depicted includes three stages of LP turbine rotor blades 30 and LP turbine stator airfoils 62, in other exemplary embodiments, the LP turbine 30 may include any other suitable number and/or configuration of stages of LP turbine rotor blades 60 and/or stator airfoils 62. Other configurations are contemplated as well.

Referring still to FIG. 2, it will be appreciated that each of the LP turbine rotor blades 60 of a respective stage of LP turbine rotor blades 60 extends between a radially inner end 74 (the radially inner ends 74 connected to a respective rotor 66) and a radially outer end 76. Additionally, the turbine section of the exemplary turbine engine 10 depicted includes an outer liner 78 surrounding the stage of rotor blades 60 and defining at least in part the core air flowpath through the turbine section, and more specifically, through the LP turbine 30 depicted.

Figure 3:
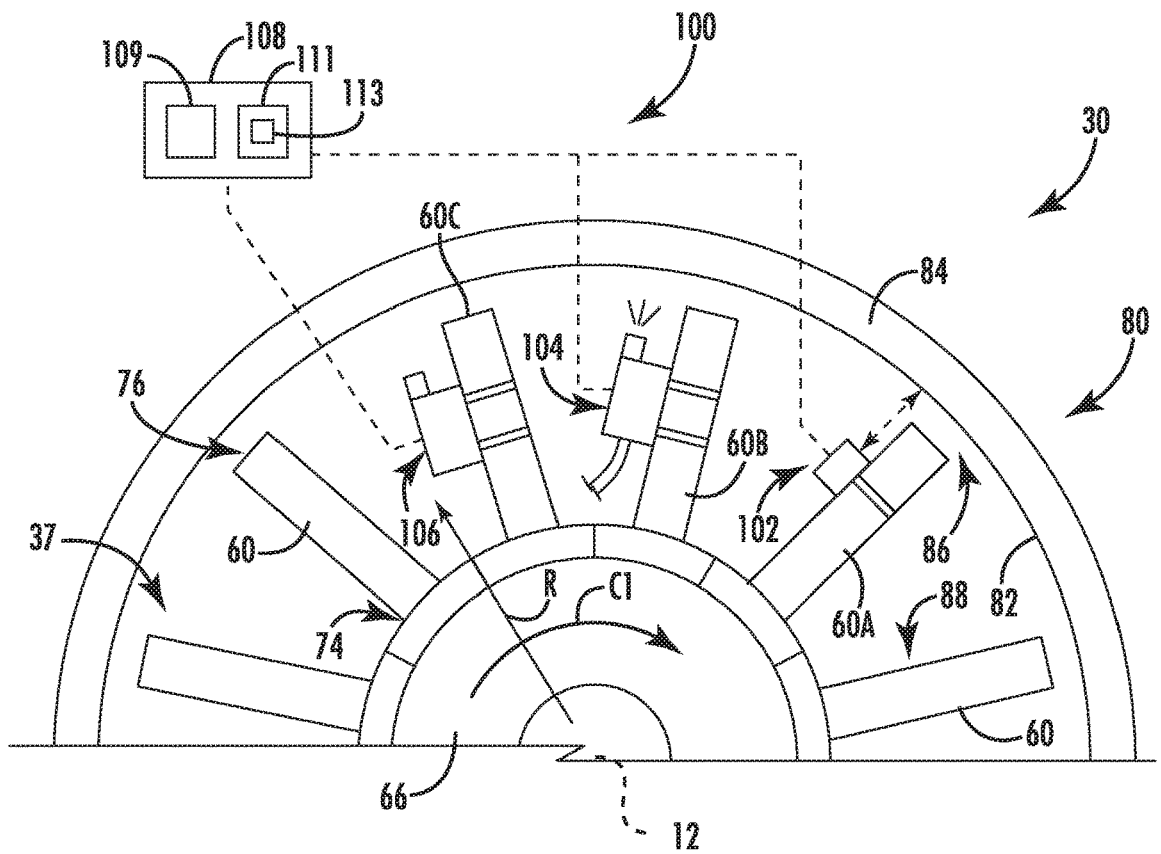
FIG. 3 is a close-up, axial view of a stage of rotating airfoils of the exemplary gas turbine engine of FIG. 1 including a deposition system in accordance with an exemplary aspect of the present disclosure.

Reference will now also be made to FIG. 3, providing a schematic, axial view of an aft-most stage of LP turbine rotor blades 60 of the LP turbine 30 of FIG. 2 with an abradable layer deposition system 100 (referred to herein as a "deposition system 100"; described below) positioned therewith in accordance with an exemplary embodiment of the present disclosure. The deposition system 100 may also be referred to as a "repair tool" given the functionality described herein.

As is depicted, surrounding each stage of LP turbine rotor blades 60, the outer liner 78 includes an outer band 80. As used herein, the term "outer band" refers generally to any inner surface/component of an annulus surrounding a rotating stage of airfoils. For example, the outer band may include one or more liner components, shroud segments, etc. Referring particularly to FIG. 3, the outer band 80 surrounding a particular stage of LP turbine rotor blades 60 (such as the aft-most stage in FIG. 3) further includes an abradable layer 82 fixed to a permanent base 84. The abradable layer 82 is configured to be in close contact with the radially outer ends 76 of the plurality of LP turbine rotor blades 60 of the respective stage to increase an efficiency of the LP turbine 30. Moreover, it will be appreciated that the LP turbine 30, or rather, each stage of LP turbine rotor blades 60 defines a gap 86 with the abradable layer 82 of the outer band 80 surrounding such stage of LP turbine rotor blades 60. Throughout continued operation of the engine, the gap 86 between the abradable layer 82 and the radially outer ends 76 of the LP turbine rotor blades 60 of a given stage within the LP turbine 30 may increase. Such may be due to, e.g., an expansion and contraction of various engine components during normal operation cycles of the engine. Regardless, the increase in the size of the gap 86 may lead to a decrease in efficiency of the turbine engine 10.

Referring particularly to FIG. 3, the deposition system 100 is provided to repair the abradable layer 82 in situ to reduce a size of the gap 86 without having to, e.g., take the engine off-wing and/or disassemble the engine to expose the abradable layer. For the embodiment depicted, the deposition system 100 generally includes a sensing module 102, a spray module 104, and a contour module 106, each of which, for the embodiment depicted, are operably coupled to a controller 108 of the deposition system 100. As is shown schematically, the controller generally includes one or more processors 109 and memory 111. The memory 111 may store data 113. The data may include instructions that, when executed by the one or more processors 109, cause the deposition system 100 to perform functions. Certain of these functions are described below, e.g., with respect to the exemplary method 300 of FIG. 11. Notably, the controller 108 is operably coupled to each of the modules 102, 104, 106 through a communication bus, and more specifically, through a wireless communication bus (as is noted using phantom lines in FIG. 3).

Further, as is also depicted, for the embodiment shown the sensing module 102 is coupled to a first LP turbine rotor blade 60A, the spray module 104 is coupled to a second LP turbine rotor blade 60B, and the contour module 106 is coupled to a third LP turbine rotor blade 60C. More specifically, each of these modules 102, 104, 106 are releasably coupled to the respective LP turbine rotor blades 60A, 60B, 60C, such that they may be removed after completion of the repair described herein. It will be appreciated, however, that in other embodiments, one or more of the modules 102, 104, 106 may be mounted to the same LP turbine rotor blade 60, or spaced apart to any suitable rotor blade 60 (not in sequence as shown).

Additionally, as will be appreciated from the discussion below, during operation of the deposition system 100, the stage of LP turbine rotor blades 60 (including the first LP turbine rotor blade 60A, the second LP turbine rotor blade 60B, and the third LP turbine rotor blade 60C) may be rotated in a circumferential direction C, and more specifically, in a first circumferential direction C1, such that the various modules 102, 104, 106 may also be moved in the first circumferential direction C1 during operation of the deposition system 100.

Figure 4:
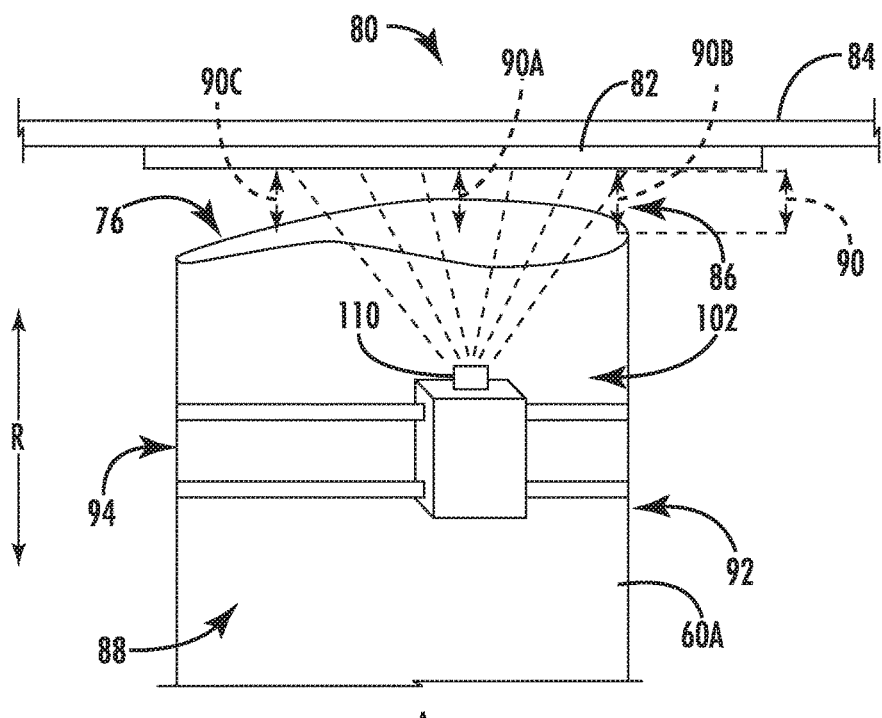
FIG. 4 is a close-up view of a first airfoil of the stage of rotating airfoils of FIG. 3.

Referring still to FIG. 3, and now also to FIG. 4, the sensing module 102 will be discussed. FIG. 4 provides a close-up, schematic view of a pressure side 88 of the first LP turbine rotor blade 60A with the sensing module 102 removably attached thereto. For the embodiment depicted, the sensing module 102 includes a sensor 110 oriented towards the abradable layer 82 of the outer band 80 surrounding the stage of LP turbine rotor blades 60. The sensor 110 may be, e.g., a proximity sensor, such that the sensing module 102 may be utilized to determine a measure (generally referred to using the numeral "90") of the gap 86 along the radial direction R between the outer ends 76 of the plurality of LP turbine rotor blades 60 and the outer band 80, and more specifically, the measure 90 of the gap 86 along the radial direction R between the outer ends 76 of the plurality of LP turbine rotor blades 60 and the abradable layer 82 of the outer band 80.

Additionally, it will be appreciated that when the deposition system 100 is rotated in the first circumferential direction C1 during operation of the deposition system 100, the deposition system 100 using the sensing module 102 may determine a two-dimensional measure 90 of the gap 86 along the radial direction R and along the circumferential direction C. More specifically, referring now briefly to FIG. 5, a graph 250 is provided depicting the measure 90 of the gap 86 (and more specifically, a first measure 90A, as will be explained below) between the radially outer ends 76 of the plurality of guide airfoils and the outer band 80 along the radial direction R and along the circumferential direction C. Specifically, the graph 250 depicts the value of the measure 90 of the gap 86 along the radial direction R along the Y-axis 252 and the circumferential position of the measure 90 of the gap 86 (in degrees, with 0 degrees and 360 degrees being the same position) along the X-axis 254. Accordingly, it will be appreciated that the deposition system 100 may determine, using the sensing module 102, the measure 90 of the gap 86 along the radial direction R at any given circumferential position, which for the embodiment depicted varies between about X and X' for any given position along the circumferential direction C. In such a manner, the gap 86 is nonuniform along the circumferential direction C.

Referring back to FIG. 4, as is also depicted, the exemplary sensor 110 of the sensing module 102 depicted is capable of taking a plurality of measurements (i.e., determining a plurality of measures 90) generally along the axial direction A for a given circumferential position. For example, the sensor 110 of the exemplary sensing module 102 depicted may be capable of determining a first measure 90A of the gap 86 between the outer ends 76 of the plurality of LP turbine rotor blades 60 and the abradable layer 82 of the outer band 80 proximate an axial midpoint of the LP turbine rotor blades 60, second measure 90B of the gap 86 between the outer ends 76 of the plurality of LP turbine rotor blades 60 and the abradable layer 82 of the outer band 80 proximate a forward edge 92 of the LP turbine rotor blades 60, and a third measure 90C of the gap 86 between the outer ends 76 of the plurality of LP turbine rotor blades 60 and the abradable layer 82 of the outer band 80 proximate an aft edge 94 of the LP turbine rotor blades 60.

Figure 5:
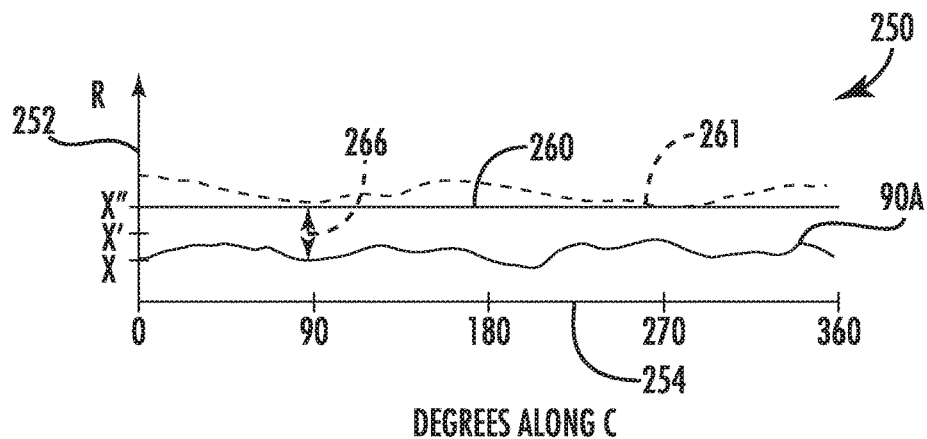
FIG. 5 is a graph depicting a first measure of a gap between the stage of rotating airfoils of FIG. 3 and an abradable layer surrounding the stage of airfoils.
Figure 6:
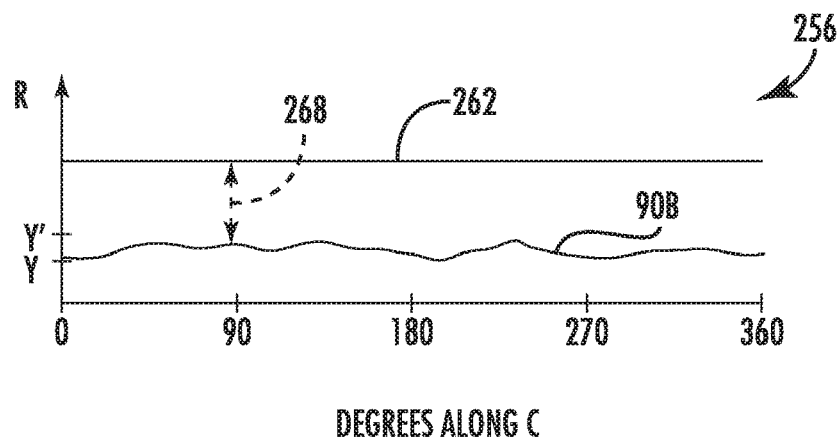
FIG. 6 is a graph depicting a second measure of the gap between the stage of rotating airfoils of FIG. 3 and the abradable layer surrounding the stage of airfoils.
Figure 7:
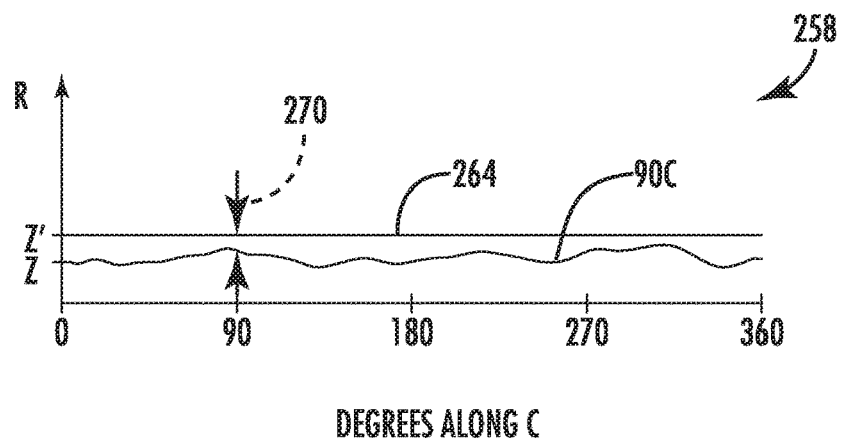
FIG. 7 is a graph depicting a third measure of the gap between the stage of rotating airfoils of FIG. 3 and the abradable layer surrounding the stage of airfoils.

Notably, the first measure 90 of the gap 86 along the radial direction R and along the circumferential direction C is depicted in FIG. 5. Referring now also briefly to FIGS. 6 and 7, FIG. 6 provides a graph 256 depicting the second measure 90B of the gap 86 between the radially outer ends 76 of the plurality of guide airfoils and the outer band 80 along the radial direction R and along the circumferential direction C; and FIG. 7 provides a graph 258 depicting the third measure 90C of the gap 86 between the radially outer ends 76 of the plurality of guide airfoils and the outer band 80 along the radial direction R and along the circumferential direction C. Specifically, the graph 256 depicts the value of the second measure 90B of the gap 86 along the radial direction R along the Y-axis 252 and the circumferential position of the second measure 90B of the gap 86 (in degrees, with 0 degrees and 360 degrees being the same position) along the X-axis 254; and similarly, the graph 258 depicts the value of the third measure 90C of the gap 86 along the radial direction R along the Y-axis 252 and the circumferential position of the third measure 90C of the gap 86 (in degrees, with 0 degrees and 360 degrees being the same position) along the X-axis 254. Accordingly, it will be appreciated that the deposition system 100 may further determine, using the sensing module 102, the second measures 90B of the gap 86 along the radial direction R at any given circumferential position, which for the embodiment depicted varies between about Y and Y' for any given position along the circumferential direction C, as well as the third measures 90C of the gap 86 along the radial direction R at any given circumferential position, which for the embodiment depicted varies between about Z and Z' for any given position along the circumferential direction C.

Notably, while for the embodiment depicted, three separate measurements are described at different locations along the axial direction A, in other embodiments, any other suitable number of measures 90 may be taken at different locations along the axial direction A by the sensor 110 of the sensing module 102. For example, in other embodiments, the sensor 110 of the sensing module 102 may sense a measure 90 of the gap 86 at two locations spaced along the axial direction A, at four or more locations spaced along the axial direction A, at ten or more locations spaced along the axial direction A, or, e.g., up to 5000 locations spaced along the axial direction A. In such a manner, it will be appreciated that the deposition system 100, utilizing the sensor 110 the sensing module 102, may determine a three-dimensional measure 90 of the gap 86 along the radial direction R, the circumferential direction C, and the axial direction A.

Figure 8:
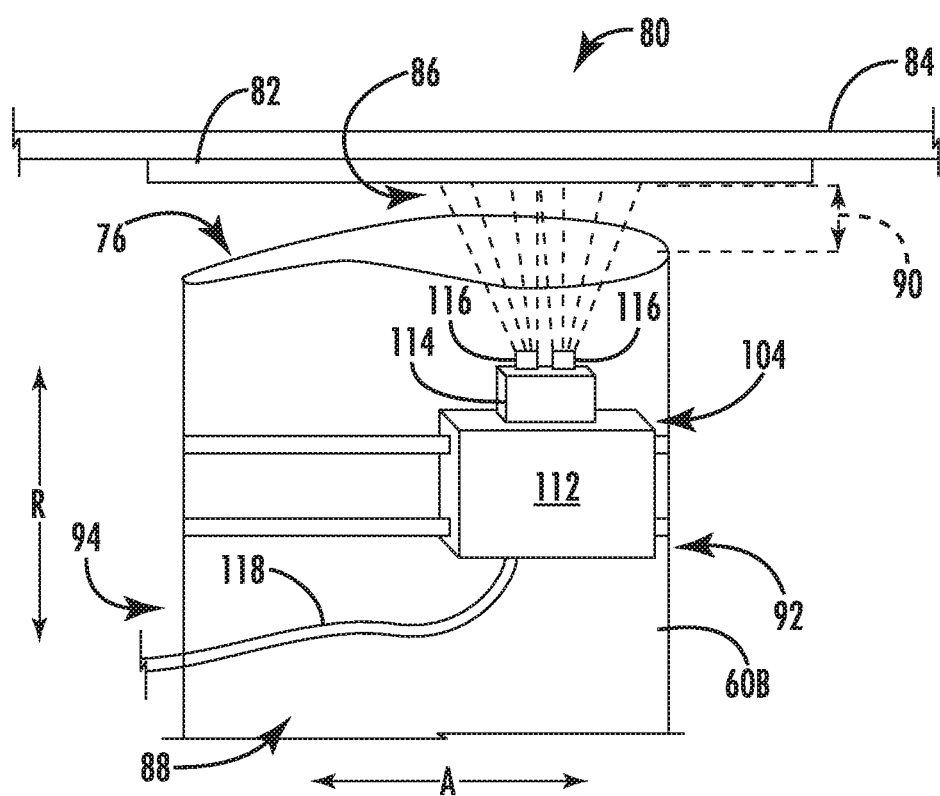
FIG. 8 is a close-up view of a second airfoil of the stage of rotating airfoils of FIG. 3.

Referring now to FIG. 8, a close-up, schematic view is provided of a pressure side 88 of the second LP turbine rotor blade 60B with the spray module 104 removably attached thereto. For the embodiment depicted, the spray module 104 generally includes a base 112 and a dispenser head 114 with one or more dispenser nozzles 116 positioned thereon and oriented towards the outer band 80 for depositing an abradable material onto the outer band 80. More specifically, the one or more dispenser nozzles 116 are configured for dispensing an abradable material onto the abradable layer 82 of the outer band 80.

It will be appreciated that the abradable material deposited by the spray module 104 may be any suitable abradable material. For example, the abradable material may be a rubber-based abradable material. In such a case, the base 112 and/or the spray head 114 may include a heater to heat up the abradable material to allow the nozzles 116 to dispense it in the manner depicted. However, in other exemplary embodiments, the abradable material may be any other suitable material. Further, it will be appreciated, that as used herein, the term "abradable" refers generally to a material designed to wear down when rubbed with another material. Specifically, in the context used herein, the abradable material refers to a material designed to wear down when the outer ends 76 of a rotating airfoil rubs against it.

Referring still to the embodiment of FIG. 8, the one or more dispenser nozzles 116 of the plurality of dispenser nozzles 116 are spaced from one another generally along the axial direction A. More specifically, for the embodiment depicted, the one or more dispenser nozzles 116 includes two dispenser nozzles 116 spaced from one another generally along the axial direction A. However, in other embodiments, the one or more dispenser nozzles 116 may include any other suitable number of dispenser nozzles 116, such as a single dispenser nozzle 116, three or more dispenser nozzles 116, five or more dispenser nozzles 116, or up to, e.g., about twenty dispenser nozzles 116.

In certain exemplary embodiments, the base 112 may contain a volume of the abradable material to be deposited by the one or more dispenser nozzles 116. However in other embodiments, the one or more dispenser nozzles 116 may be fluidly coupled to a source located remotely from the base 112 of the spray module 104 by way of a fluid tube 118, such as in the embodiment depicted. For example, the fluid tube 118 may be fed to the base 112 through a hole in the turbine engine 10 (e.g., a borescope hole, fuel nozzle opening, ignitor opening, etc.), or through the core air flowpath 37 of the turbine engine 10.

The one or more dispenser nozzles 116, as noted, are configured for depositing the abradable material onto the abradable layer 82 of the outer band 80. In certain exemplary embodiments, the spray module 104 may be controlled to provide a uniform amount of abradable material along the circumferential direction C, or alternatively may be controlled to provide a nonuniform amount of abradable material along the circumferential direction C. For example, the spray module 104, using the one or more dispenser nozzles 116, may be configured to provide an increased amount of abradable material at certain circumferential locations where the gap 86 was measured to be greater or lesser than other areas. In such a manner, the deposition system 100 may be able to provide a layer of new abradable material, such that the resulting abradable layer 82 defines a desired gap 86 along the circumferential direction C between the radially outer ends 76 of the plurality of LP turbine rotor blades 60 and the outer band 80, despite a nonuniform underlying/starting abradable layer 82. For example, referring back briefly to FIG. 5, a measure 260 of the gap 86 between the resulting abradable layer 82 and the outer ends 76 of the LP turbine rotor blades 60 is depicted along the radial direction R and along the circumferential direction C. As is depicted, for the embodiment shown, the measure 260 is a substantially uniform radial value of X" along the circumferential direction C.

Referring still to FIG. 8, it will be appreciated that the exemplary spray module 104 is further capable of modifying an amount of abradable material provided onto the existing/underlying abradable layer 82 of the outer band 80 along the axial direction A. In such a manner, the spray module 104, through the one or more dispenser nozzles 116, may further be capable of providing a nonuniform thickness of abradable material along the axial direction A.

For example, the deposition system 100 may be able to provide a layer of new abradable material proximate the forward edge 92 of the LP turbine rotor blade 60 different than the amount provided proximate an axial midpoint and different than an amount proximate the aft edge 94. For example, referring back also to FIGS. 6 and 7, FIG. 6 shows a second measure 262 of the gap 86 between the resulting abradable layer 82 and the outer ends 76 of the LP turbine rotor blades 60 proximate the forward edge 92 along the radial direction R and along the circumferential direction C having a substantially uniform radial value of Y" along the circumferential direction C; and FIG. 7 shows a third measure 264 of the gap 86 between the resulting abradable layer 82 and the outer ends 76 of the LP turbine rotor blades 60 proximate the aft edge 94 along the radial direction R and along the circumferential direction C having a substantially uniform radial value of Z" along the circumferential direction C.

Further, referring still generally to FIGS. 5 through 7, for a given circumferential position, such as the 90 degree circumferential position, the spray module 104 may be capable of depositing a first thickness 266 of abradable material proximate the axial midpoint of the LP turbine rotor blades 60 (FIG. 5), a second thickness 268 of abradable material proximate the forward edge 92 of the LP turbine rotor blades 60 (FIG. 6), and a third thickness 270 of abradable material proximate the aft edge 94 of the LP turbine rotor blades 60 (FIG. 7). In such a manner, the resulting abradable layers 82 may have a different thickness at any given circumferential position and axial position, and/or may be the same thickness at any given circumferential position and axial position despite a different underlying topography. By way of example, FIG. 5 shows in phantom a line 261 representing a potential measure of a resulting gap 86 along the radial direction R and along the circumferential direction C, wherein the measure 90A of the resulting gap 86 varies/is nonuniform along the circumferential direction C.

Figure 9:
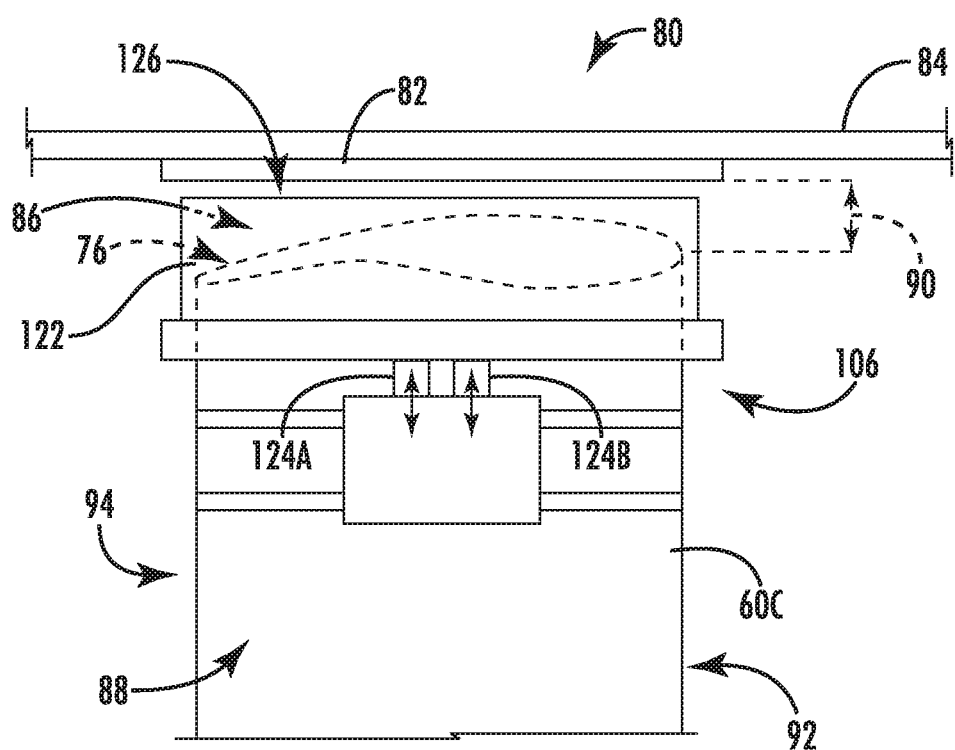
FIG. 9 is a close-up view of a third airfoil of the stage rotating airfoils of FIG. 3.

Referring now to FIG. 9, a close-up, schematic view is provided of a pressure side 88 of the third LP turbine rotor blade 60C with the contour module 106 removably attached thereto. For the embodiment depicted, the contour module 106 generally includes a base 120 and a contour member 122, with the contour member 122 attached to the base 120 through one or more extension arms 124. For the embodiment depicted, the contour member 122 is configured generally as a blade having a contouring edge 126 configured to "scrape" over the recently deposited abradable material on the outer band 80. In such a manner, the contour member 122 may ensure the resulting abradable layer 82 defines a desired, relatively smooth surface, and/or a desired thickness. It will be appreciated that although the contouring edge 126 of the contour member 122 is substantially linear for the embodiment of FIG. 9, in other exemplary embodiments, the contouring edge 126 of the contour member 122 may have any other suitable shape.

Further, as noted, the contour member 122 is attached to the base 120 through the one or more extension arms 124. More specifically, for the embodiment depicted, the contour member 122 is attached to the base 120 through a first extension arm 124A and a second extension arm 124B spaced from one another generally along the axial direction A. The first and second extension arms 124A, 124B are movable along the radial direction R, varying a resulting radial position of the contour edge 126 of the contour member 122. In such a manner, the positioning of the contour member 122 by the first and second extension arms 124A, 124B may be used to vary the resulting measure 90 of the gap 86 between the outer ends 76 of the plurality of LP turbine rotor blades 60 and the outer band 80.

Notably, in certain embodiments, the first extension arm 124A may be movable relative to the second extension arm 124B along the radial direction R (movement directions shown in phantom), such that the contour module 106 may be used to vary the resulting measure 90 the gap 86 along the axial direction A for any given circumferential position (e.g., measures 90A, 90B, 90C). It will be appreciated that in such an exemplary embodiment, the spray module 104 may not be configured to vary the amount of abradable material sprayed along the axial direction A, and instead the deposition system 100 may utilize the contour member 122 to provide the variance in the resulting measure 90 the gap 86 along the axial direction A. However, in other exemplary embodiments, a single extension arm 124 may be used to couple the contour member 122 to the base 120, or alternatively the contour member 122 may be coupled to the base 120 in a fixed manner, or alternatively still any other suitable number of extension arms 124 may couple a plurality of contour members 122 (e.g., arranged axially) to the base 120.

Furthermore, it will be appreciated that in at least certain exemplary embodiments, the contour member 122 may be used, in addition to smoothing out the recently deposited abradable material, as a scraper prior to depositing abradable material using the spray module 104 to remove at least a portion of the existing abradable layer 82. For such a configuration, the same contour member 122 may be used, or alternatively, the contour member 122 may be switched out for such operations. Additionally, or alternatively still, other systems or configurations may be utilized for preparing the abradable layer 82 for receipt of new abradable material.

It will be appreciated, however, that in other exemplary embodiments, the deposition system 100 may have any other suitable configuration. For example, in other exemplary embodiments of the present disclosure, the exemplary deposition system 100 may include any other configuration of recontouring module 106, or alternatively, may not include a recontouring module 106. Further, in other exemplary aspects, the sensor module 102 may include any other suitable number of sensors 110, the various modules 102, 104, 106 may be removably attached to airfoils spaced further apart along the circumferential direction C, etc.

Figure 10:
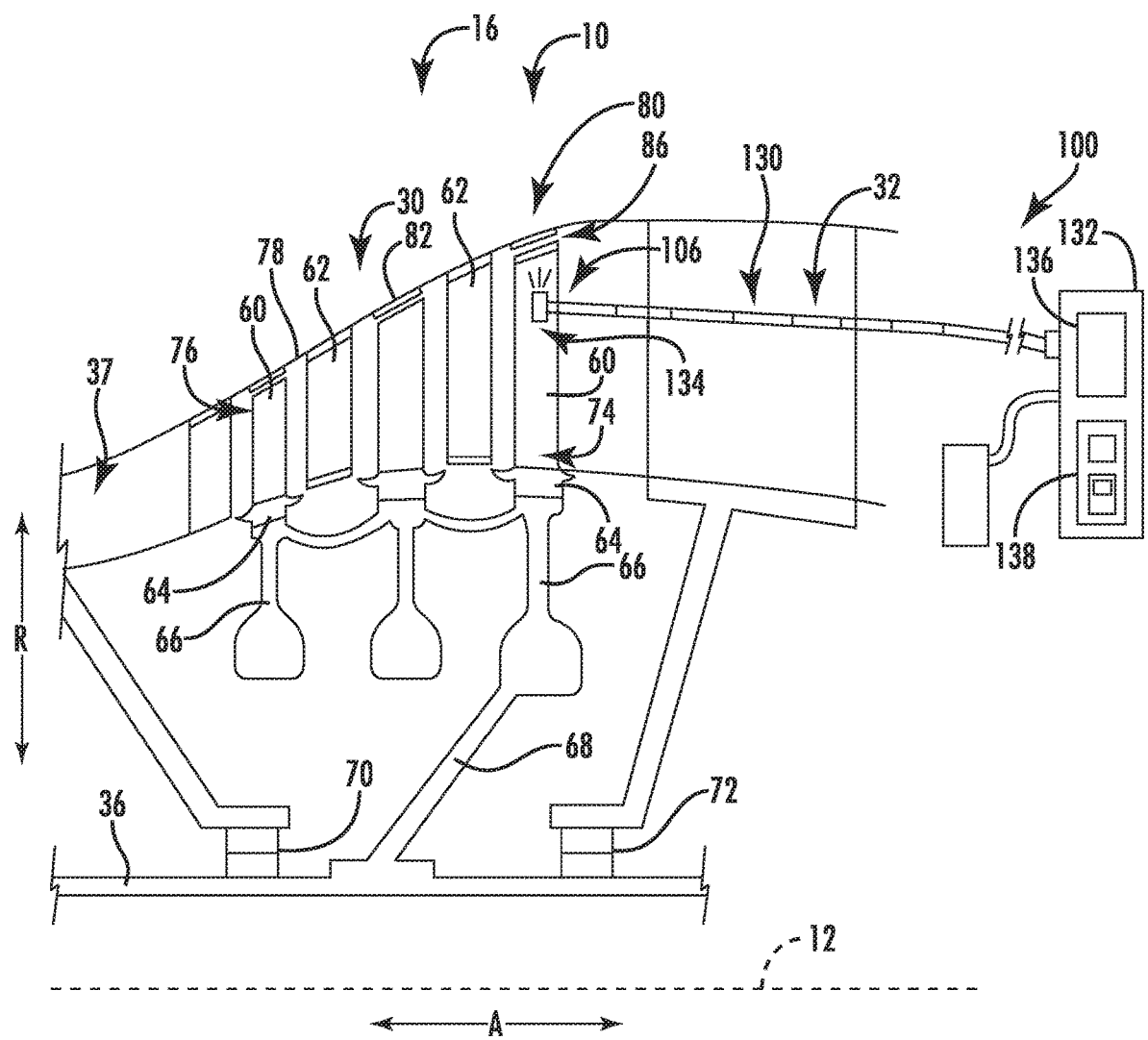
FIG. 10 is a close-up, cross-sectional view of an aft end of an exemplary gas turbine engine in accordance with another exemplary embodiment of the present disclosure.

Additionally, it will be appreciated that in still other exemplary embodiments, any other suitable deposition system 100 may be utilized for applying abradable material to the outer band 80 surrounding a rotating stage airfoils in situ (i.e., without having to take the engine off wing and/or disassemble the engine to expose the part being repaired). For example, referring now to FIG. 10, a deposition system 100 in accordance with another exemplary embodiment of the present disclosure is provided for performing such in situ repair. FIG. 10 provides a close-up, schematic view of an aft end of a turbomachine 16 of a turbofan engine 10 in accordance with an exemplary embodiment of the present disclosure. More specifically, FIG. 10 provides a close-up, schematic view of an LP turbine 30 of the turbine section of the exemplary turbofan engine 10. It will be appreciated that in at least certain exemplary embodiments, the LP turbine 30 depicted in FIG. 10 may be configured in substantially the same manner as the exemplary LP turbine 30 described above with reference to FIG. 2. Accordingly, the same or similar numbers refer to the same or similar parts.

For example, as is depicted, the LP turbine 30 generally includes a plurality of stages of LP turbine rotor blades 60 alternatingly spaced with a plurality of stages of LP turbine stator airfoils 62. Each of the LP turbine rotor blades 60 of a respective stage of LP turbine rotor blades 60 extends between a radially inner end 74 connecting to a respective rotor 66 and a radially outer end 76. Additionally, the turbine section depicted includes an outer liner 78 defining at least in part the core air flowpath 37 through the turbine section, and more specifically, through the LP turbine 30 depicted. More specifically, surrounding each stage of LP turbine rotor blades 60, the outer liner 78 includes an outer band 80 having an abradable layer 82 fixed to a permanent base 84 (see, e.g., FIG. 3). It will be appreciated that the LP turbine 30, or rather, each stage of LP turbine rotor blades 60 defines a gap 86 with the abradable layer 82 of the outer band 80 surrounding such stage of LP turbine rotor blades 60.

In addition, a deposition system 100 is provided in accordance with another exemplary embodiment of the present disclosure. The exemplary deposition system 100 is configured to spray an abradable material to the abradable layer 82 of a portion of the outer band 80 surrounding a particular stage of LP turbine rotor blades 60. More specifically, for the embodiment depicted, the deposition system 100 is configured as a snake arm tool configured to extend through an opening of the turbine engine 10. For the embodiment depicted the snake arm tool generally includes a snake arm 130 and a base 132, with the snake arm 130 coupled to the base 132. Snake arm 130 includes a utility head 134 at a distal end thereof, which for the embodiment shown includes a spray tool coupled thereto (e.g., one or more spray nozzles for spraying an abradable material). Further, the base 132 of the snake arm tool includes one or more motors 136 and a controller 138, the one or more motors 136 operable with the snake arm 130 for moving the snake arm 130 in a desired direction to a desired location/orientation. The controller 138 is further operably coupled to the one or more motors 136 for operating the one or more motors 136, and in turn, the snake arm 130.

For the embodiment depicted, the snake arm 130 is extended through the exhaust section 32 of the turbine engine 10 to the stage of LP turbine rotor blades 60 such that it may spray the abradable material on the abradable layer 82 surrounding such stage of LP turbine rotor blades 60. It will be appreciated that although for the embodiment of FIG. 10, the utility head 134 of the snake arm tool is fixed with a spray nozzle 116, in other embodiments, the utility head 134 of the snake arm tool may additionally or alternatively be fixed with a sensor for determining a measure of the gap 86 between the outer ends 76 of the plurality of LP turbine rotor blades 60 and the outer band 80; a contouring tool for re-contouring abradable material deposited on the outer band 80 by, e.g., the spray nozzles 116; a scraper for removing least a portion of the existing material prior to spraying new abradable material onto the outer band 80; or any other suitable or desired tool.

Notably, although discussed with reference to the LP turbine 30, in other exemplary embodiments it will be appreciated that the deposition systems 100 may be utilized with other components of the turbine engine 10. For example, the turbine engine 10 may include various other components having one or more rotating stages of airfoils (e.g., rotating stages of rotor blades) with an outer band 80 having an abradable layer 82 surrounding such rotating stage airfoils. For example, one or more of an HP compressor 24, LP compressor 22, and HP turbine 28 may include a stage of rotating airfoils surrounded by an outer band 80 having an abradable layer 82. Additionally, in certain embodiments, a fan 38 having fan blades 40 may include an outer band (on/in the outer nacelle 50) having abradable layer 82. In certain embodiments, the deposition system 100 may be utilized with any of such components.

Figure 11:
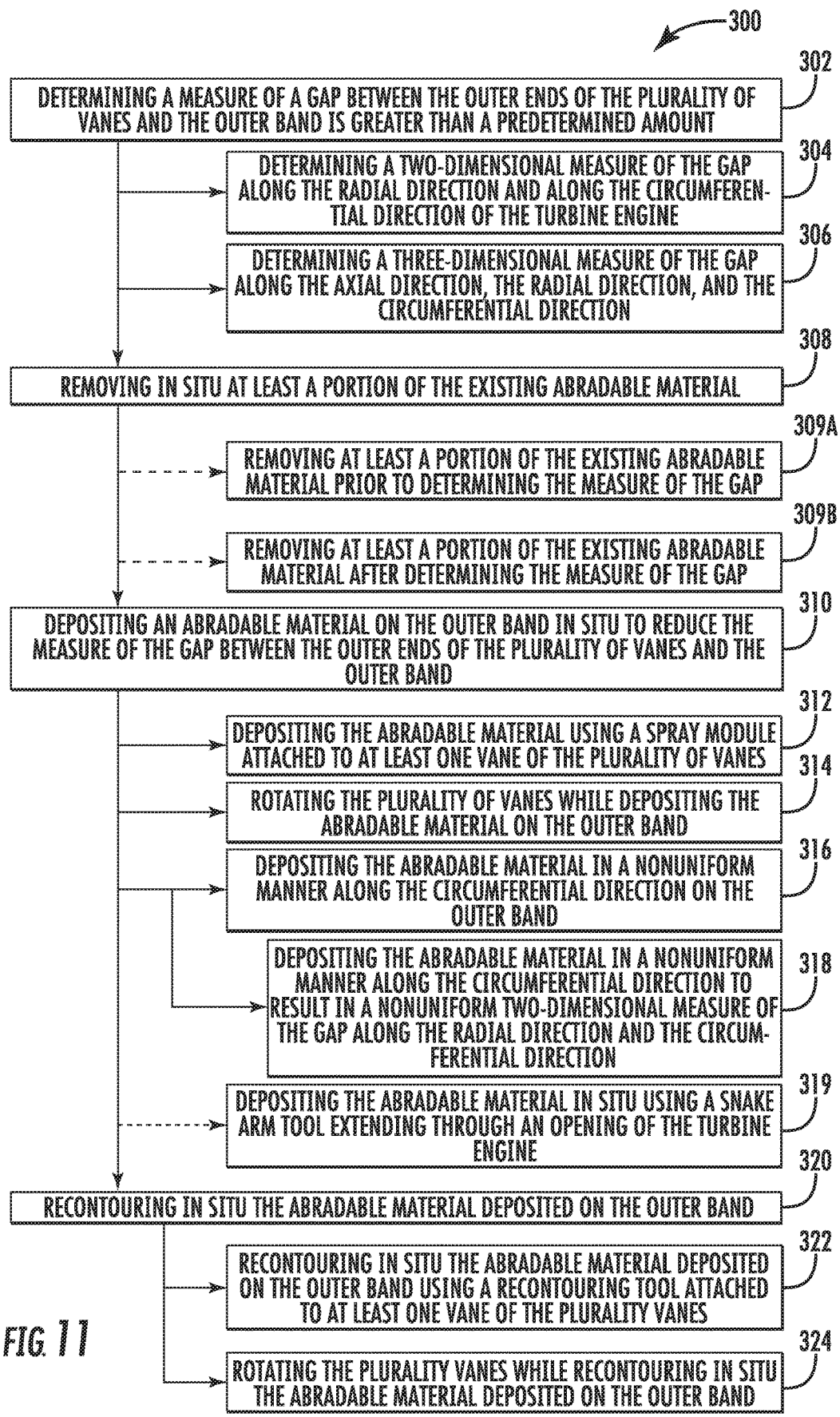
FIG. 11 is a flow diagram of a method for repairing a gas turbine engine in accordance with an exemplary aspect of the present disclosure.

Referring now to FIG. 11, a method 300 for repairing a turbine engine in accordance with an exemplary aspect of the present disclosure is provided. In at least certain exemplary aspects, the method 300 may be utilized with the turbine engine and deposition systems discussed above with reference to, e.g., FIGS. 1 through 10. Accordingly, it will be appreciated that the turbine engine generally includes a rotating stage of airfoils and an outer band surrounding the rotating stage of airfoils. The rotating stage of airfoils includes a plurality of airfoils defining an outer end along a radial direction of the turbine engine.

The method 300 generally includes at (302) determining a measure of a gap between the outer ends of the plurality of airfoils and the outer band is greater than a predetermined amount. In at least certain exemplary aspects, determining the measure of the gap at (302) may include determining the measure of the gap utilizing a sensor.

Further, in at least certain exemplary aspects, determining the measure of the gap at (302) may include determining a single point measure of the gap (e.g., a width of the gap along the radial direction at a single location along circumferential direction of the engine). However, in other exemplary aspects, such as the exemplary aspect depicted in FIG. 11, determining the measure of the gap at (302) further includes at (304) determining a two-dimensional measure of the gap along the radial direction and along the circumferential direction of the turbine engine. For example, the method 300 may, at (304) determine a measure of the gap at a given axial position and at a plurality of circumferential locations (such as at least about eight circumferential locations, such as at least about twelve circumferential locations, such as at least about twenty circumferential locations, such as up to about 10,000 circumferential locations). In such a manner, the sensor (or sensors) may be part of a sensing module, and the sensing module may be coupled to one or more of the airfoils of the rotating stage of airfoils. The rotating stage of airfoils and sensing module may be rotated during the determining of the measure of the gap at (302) to determine the two-dimensional measure of the gap along the radial direction and along the circumferential direction of the turbine engine.

Referring still to FIG. 11, it will be appreciated that in at least certain exemplary aspects, in addition to determining the two-dimensional measure of the gap at (304), determining the measure of the gap at (302) may further include at (306) determining a three-dimensional measure of the gap along the axial direction, the radial direction, and the circumferential direction. With such an exemplary aspect, in addition to the two-dimensional measurements determined at (304), the method 300 may determine such two-dimensional measurements at a variety of axial locations, such as at least about two axial locations, such as at least about three axial locations, such as at least about five axial locations, such as up to about 5000 axial locations.

Additionally, in certain exemplary aspects of the method 300 depicted in FIG. 11, the method 300 may further include at (308) removing in situ at least a portion of the existing abradable material. For example, removing in situ at least a portion of the abradable material at (308) may include scraping off a portion of the abradable material. For example, removing in situ at least a portion of the abradable material at (308) may include at (309A) removing at least a portion of the existing abradable material prior to determining the measure of the gap at (302), such that any loose abradable material is first removed before the measure of the gap is determined. Alternatively, removing in situ at least a portion of the abradable material at (308) may include at (309B) removing at least a portion of the existing abradable material after determining the measure of the gap at (302), such that a desired amount of abradable material is removed to result in a desired gap. Notably, however, in still other exemplary aspects, the method 300 may not include such removal step.

Further, the method 300 additionally includes at (310) depositing an abradable material on the outer band in situ to reduce the measure of the gap between the outer ends of the plurality of airfoils and the outer band. For the exemplary aspect depicted, depositing the abradable material on the outer band in situ at (310) includes at (312) depositing the abradable material using a spray module attached to at least one airfoil of the plurality of airfoils (e.g., removably attached). Moreover, with such an exemplary aspect, depositing the abradable material on the outer band in situ at (310) further includes at (314) rotating the plurality of airfoils while depositing the abradable material on the outer band.

In certain exemplary aspects, depositing the abradable material on the outer band at (310) may include spraying a substantially uniform layer of abradable material on the outer band. However, for the exemplary aspect depicted in FIG. 11, depositing the abradable material on the outer band in situ at (310) includes at (316) depositing the abradable material in a nonuniform manner along the circumferential direction on the outer band. For example, with such an exemplary aspect, the method 300 may utilize the two-dimensional measure of the gap determined at (302) to determine the nonuniform manner in which the abradable material is deposited at (316). For example, the method 300 may utilize the determined two-dimensional measure the gap at (302) to deposit the abradable material in a nonuniform manner at (316) such that the resulting measure of the gap along the circumferential direction and radial direction is substantially uniform. Additionally, or alternatively, such as in the exemplary aspect depicted, depositing the abradable material in a nonuniform manner at (316) includes at (318) depositing the abradable material in a nonuniform manner along the circumferential direction to result in a nonuniform two-dimensional measure of the gap along the radial direction and the circumferential direction. With such an exemplary aspect, it may be determined that it would be beneficial to include additional abradable material at various circumferential locations to increase an efficiency of the turbine engine (e.g., at circumferential locations known to expand or contract more or less than other circumferential locations).

Notably, although depositing the abradable material at (310) above is discussed with reference to a spray module attached to at least one of the plurality of rotating airfoils, in other exemplary aspects, any other suitable deposition system may be utilized. For example, as is depicted in phantom, in other certain exemplary aspects, depositing the abradable material at (310) may include at (319) depositing the abradable material in situ using a snake arm tool extending through an opening of the turbine engine.

Further, although not depicted, in certain exemplary aspects, the method 300 may further utilize the three-dimensional measure of the gap determined at (306). For example, depositing the abradable material at (310) may include depositing the abradable material in view of the 3 dimensional measure of the gap determined at (306) to result in a desired three-dimensional measure of the gap. More specifically, depositing the abradable material at (310) may include depositing the abradable material in a uniform manner along the axial direction, or alternatively, in a nonuniform manner along the axial direction. Such may allow for the resulting measure the gap to define a desired three-dimensional shape As is also depicted in FIG. 11, the method 300 includes at (320) recontouring in situ the abradable material deposited on the outer band. For the exemplary aspect depicted, recontouring in situ the abradable material at (320) includes at (322) recontouring in situ the abradable material deposited on the outer band using a recontouring tool attached to at least one airfoil of the plurality airfoils. More specifically, for the exemplary aspect depicted, recontouring in situ the abradable material deposited on the outer band at (320) includes at (324) rotating the plurality airfoils while recontouring in situ the abradable material deposited on the outer band.

It will be appreciated that using a deposition system in accordance with one or more exemplary aspects of the present disclosure, and/or performing a repair of the turbine engine in accordance with one or more exemplary aspects the present disclosure, may allow for an engine to spend an increased time on wing between repairs. More specifically, by performing the repair of the abradable layer in situ using, e.g., one or more of the exemplary deposition tools described herein, the engine may be repaired without requiring the engine to be taken off wing, and/or disassembled. Such may save considerable time and cost.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for repairing a turbine engine comprising a rotating stage of airfoils and an outer band surrounding the rotating stage of airfoils,
the rotating stage of airfoils including a plurality of airfoils defining an outer end, the method comprising:
determining a measure of a gap between the outer ends of the plurality of airfoils and the outer band is greater than a predetermined amount; and
depositing an abradable material on the outer band in situ to reduce the measure of the gap between the outer ends of the plurality of airfoils and the outer band,
wherein depositing the abradable material on the outer band in situ comprises depositing the abradable material using a spray module attached to at least one airfoil of the plurality of airfoils, and depositing the abradable material on the outer band in situ further comprises rotating the plurality of airfoils while depositing the abradable material on the outer band in situ.

2. The method of claim 1, wherein depositing the abradable material on the outer band in situ comprises depositing the abradable material using a spray module attached to at least one airfoil of the plurality of airfoils.

3. The method of claim 2, wherein depositing the abradable material on the outer band in situ further comprises rotating the plurality of airfoils while depositing the abradable material on the outer band in situ.

4. The method of claim 1, wherein the turbine engine defines a radial direction and a circumferential direction, and wherein determining the measure of the gap between the outer ends of the plurality of airfoils and the outer band comprises determining a two-dimensional measure of the gap along the radial direction and the circumferential direction.

5. The method of claim 1, wherein the turbine engine defines an axial direction, a radial direction, and a circumferential direction, and wherein determining the measure of the gap between the outer ends of the plurality of airfoils and the outer band comprises determining a three-dimensional measure of the gap along the axial direction, the radial direction, and the circumferential direction.

6. The method of claim 1, further comprising:
removing in situ at least a portion of the existing abradable material.

7. The method of claim 1, further comprising:
recontouring in situ the abradable material deposited on the outer band.

8. The method of claim 7, wherein recontouring in situ the abradable material deposited on the outer band comprises recontouring in situ the abradable material deposited on the outer band utilizing a recontouring tool attached to at least one airfoil of the plurality of airfoils.

9. The method of claim 8, wherein recontouring in situ the abradable material deposited on the outer band further comprises rotating the plurality of airfoils while recontouring in situ the abradable material deposited on the outer band.

10. The method of claim 1, wherein the plurality of airfoils of the rotating stage of airfoils is a plurality of rotor blades.

11. The method of claim 1, wherein depositing the abradable material on the outer band in situ comprises depositing the abradable material in situ using a snake arm tool extending through an opening of the turbine engine.

12. A method for repairing a turbine engine comprising a rotating stage of airfoils and an outer band surrounding the rotating stage of airfoils, the rotating stage of airfoils including a plurality of airfoils defining an outer end, the method comprising:
- determining a measure of a qap between the outer ends of the plurality of airfoils and the outer band is greater than a predetermined amount; and
- depositing an abradable material on the outer band in situ to reduce the measure of the gap between the outer ends of the plurality of airfoils and the outer band,
- wherein the turbine engine defines a circumferential direction, and wherein depositing the abradable material on the outer band in situ comprises depositing the abradable material in a nonuniform manner along the circumferential direction on the outer band.

13. The method of claim 12, wherein depositing the abradable material in a nonuniform manner along the circumferential direction comprises depositing the abradable material in a nonuniform manner along the circumferential direction to result in a nonuniform measure of the gap along the circumferential direction.

* * * * *